United States Patent
Schaefer et al.

(10) Patent No.: US 11,076,127 B1
(45) Date of Patent: Jul. 27, 2021

(54) SYSTEM AND METHOD FOR AUTOMATICALLY FRAMING CONVERSATIONS IN A MEETING OR A VIDEO CONFERENCE

(71) Applicant: Plantronics, Inc., Santa Cruz, CA (US)

(72) Inventors: Stephen Paul Schaefer, Cedar Park, TX (US); Alain Elon Nimri, Austin, TX (US); Rommel Gabriel Childress, Jr., Cedar Park, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 16/949,081

(22) Filed: Oct. 13, 2020

Related U.S. Application Data

(60) Provisional application No. 63/009,305, filed on Apr. 13, 2020.

(51) Int. Cl.
*H04N 7/15* (2006.01)
*H04N 5/262* (2006.01)
*H04N 7/14* (2006.01)

(52) U.S. Cl.
CPC .............. *H04N 7/15* (2013.01); *H04N 5/2628* (2013.01); *H04N 7/142* (2013.01)

(58) Field of Classification Search
CPC .................................. H04N 7/15; H04N 5/262
USPC .............................................. 348/14.01–14.16
See application file for complete search history.

(56) References Cited

U.S. PATENT DOCUMENTS

| | | | |
|---|---|---|---|
| 8,248,448 B2 | 8/2012 | Feng | |
| 8,842,161 B2 | 9/2014 | Feng | |
| 9,392,221 B2 | 7/2016 | Feng | |
| 9,723,260 B2 | 8/2017 | Feng | |
| 10,491,809 B2 | 11/2019 | Feng | |
| 10,574,899 B2 | 2/2020 | Wang | |
| 2011/0093273 A1* | 4/2011 | Lee | H04N 21/4394 704/270 |
| 2012/0002002 A1* | 1/2012 | Shaffer | H04N 7/147 348/14.09 |
| 2012/0293599 A1* | 11/2012 | Norlin | G06K 9/00892 348/14.01 |

(Continued)

FOREIGN PATENT DOCUMENTS

CN 104349040 B 1/2018
CN ZL201310331021.7 1/2018

*Primary Examiner* — Melur Ramakrishnaiah
(74) *Attorney, Agent, or Firm* — Keith Lutsch PC

(57) ABSTRACT

Utilization of a state machine to determine participant framing. The states include empty room, group framing, any talker, conversation mode and unambiguous talker. In empty room state, the conference room is framed. In group framing state, any participants in the room are framed. In any talker state, the talking participant is framed. In conversation mode state, all talking participants are framed. In unambiguous talker state, the single talking participant is framed. Various framing conditions define transitions between the states. Conditions include, presence of participants, which and number of participants that are talking for how long, system mute and far site talking. The conversation states and conditions and framing decisions provide a fully automated framing mechanism to provide pleasant framing of the individuals in the near site or end for any of the conditions relating to number of talkers, participants and the like.

20 Claims, 12 Drawing Sheets

(56) References Cited

U.S. PATENT DOCUMENTS

2017/0111595 A1* 4/2017 Soni .................. G09G 5/14
2018/0063479 A1* 3/2018 Nimri ............... H04N 5/23238

* cited by examiner

SYSTEM AND METHOD FOR AUTOMATICALLY FRAMING CONVERSATIONS IN A MEETING OR A VIDEO CONFERENCE

CROSS-REFERENCE

This application claims priority to U.S. Provisional Application Ser. No. 63/009,305, filed Apr. 13, 2020, the contents of which are incorporated herein in their entirety by reference.

TECHNICAL FIELD

This disclosure relates generally to videoconferencing and relates particularly to framing of individuals in one or more captured audio-visual streams.

BACKGROUND

In a videoconference, framing refers to the view or frame provided to the far end or site. Originally, framing was performed manually, first locally and then later remotely. The pan, tilt and zoom (PTZ) of the camera was manually controlled to provide a desired picture. Generally, the camera was set to show all participants present in the meeting room and not moved as people entered or left or different people spoke. An improvement over the manual system were systems that determined the talker and then automatically directed the camera to that talker. This would usually involve moving the camera, which was disorienting to viewers at the far end. In some cases, the last image before movement started was just displayed until movement was completed. In a further improvement, two cameras were used, one to frame all the participants or the whole room and one for talker focus. The transmitted image would change from the talker view to the room or all participant view when the talker changed, so that a live view was always available, but camera motion was not shown.

While these improvements provided a better experience than manual framing, they were still limited to all participants or a single talker. In practice, there are many more situations than these two, such as multiple talkers, and those situations were not handled smoothly. When those situations were occurring, the viewers at the far end had a less pleasant experience, as either some of the talkers were not shown or there were an excessive number of framing changes. So, while framing had improved from the manual versions, there was still room for more improvement.

SUMMARY

Examples utilize a state machine to determine participant framing. The states include empty room, group framing, any talker, conversation mode and unambiguous talker. In empty room state, the conference room is framed. In group framing state, any participants in the room are framed. In any talker state, the talking participant is framed. In conversation mode state, all talking participants are framed. In unambiguous talker state, the single talking participant is framed. Various framing conditions define transitions between the states. Conditions include, presence of participants, which and number of participants that are talking for how long, system mute and far site talking. The combination of the states and the conditions provides pleasant transitions between the various situations from empty rooms to nonspeaking participants to single talkers through multiple talkers to a presenter mode back to multiple talkers in a conversation mode and so on. The conversation states and conditions and framing decisions provide a fully automated framing mechanism to provide pleasant framing of the individuals in the near site or end for any of the conditions relating to number of talkers, participants and the like. The far site now sees the appropriate number of individuals that are talking, either in focus if there is only one or multiple if multiple individuals are talking. If no individuals are talking or the far site is doing the talking, then the natural position of framing the group is performed. These framing decisions are performed automatically without requiring input by any participant or administrator, to automatically provide a pleasant experience for the far site.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
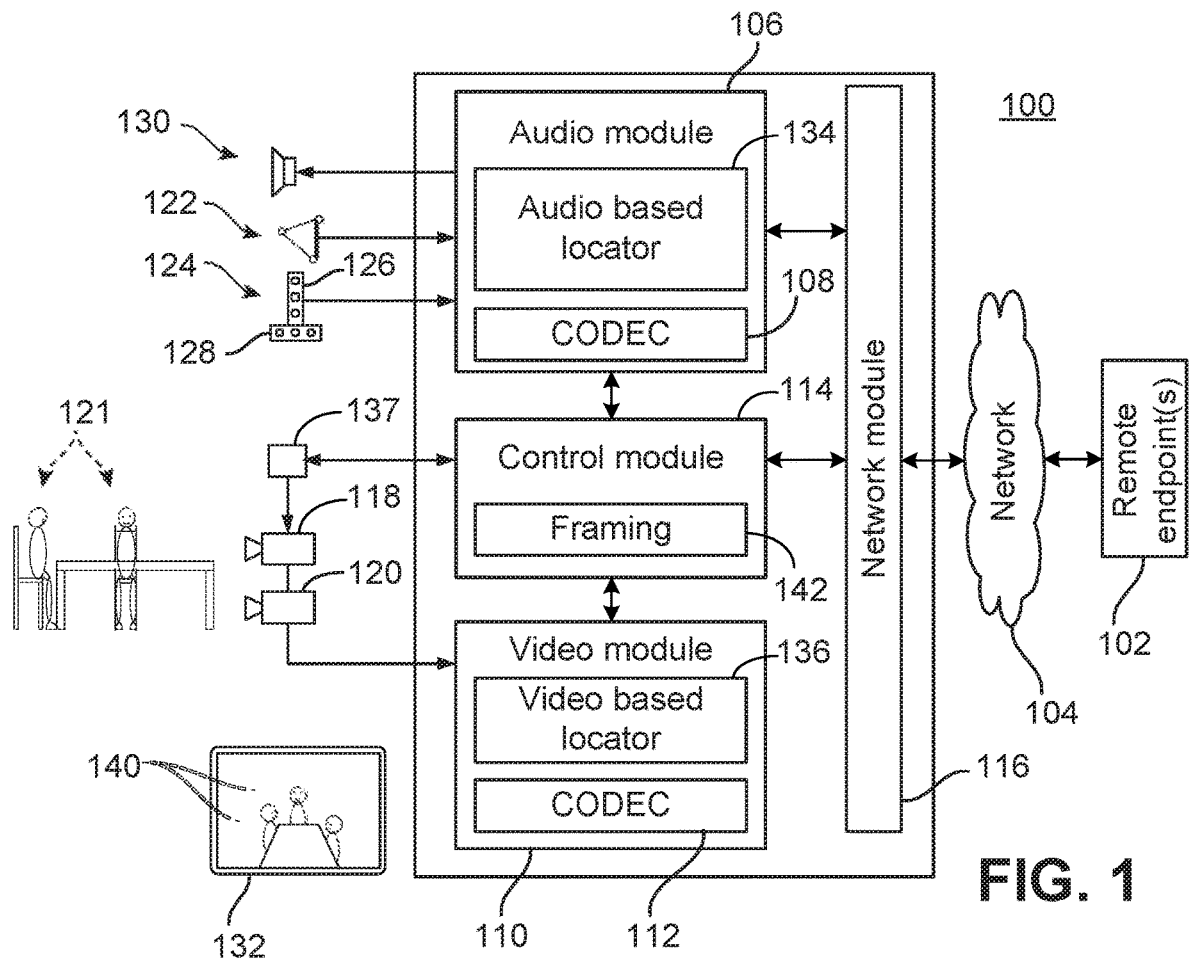
FIG. 1 is an illustration of a videoconferencing endpoint, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world to produce numerical or symbolic information. Computer vision is concerned with artificial systems that extract information from images. Computer vision includes algorithms which receive a video frame as input and produce data detailing the visual characteristics that a system has been trained to detect.

The term computer vison map (also referred to herein as an audio-visual map) includes one or more data structures which receive audio-visual frames as input, stores data pertaining to one or more targets within the audio-visual frames, and tabulates temporal data relating thereto.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

The term video frame can include a still image captured by a video stream or camera.

The term audio visualization process can include one or more system processes which evaluate data from microphones to generate an acoustic 'view' of a room or other such endpoint location.

The term sound source location can refer to a value produced by a system's audio visualization process which is indicative of a horizontal position of a current sound source.

The term audio-visual frame can refer to one or more blocks of data containing computer vision information and audio process information generated at (or corresponding to) a specific moment in time.

The term target can refer to one or more subjects of interest which are tracked using an audio-visual map.

FIG. 1 illustrates a videoconferencing endpoint 100 in accordance with an example of this disclosure. The videoconferencing apparatus or endpoint 100 communicates with one or more remote endpoints 102 over a network 104. Components of the endpoint 100 include an audio module 106 with an audio codec 108 and has a video module 110 with a video codec 112. Modules 106, no operatively couple to a control module 114 and a network module 116.

During a videoconference, one or more cameras (e.g., camera 118 and camera 120) capture video and provide the captured video to the video module no and codec 112 for processing. In at least one example of this disclosure, one camera (e.g., 118) is a smart camera and one camera (e.g., 120) is not a smart camera. In some examples, two or more cameras (e.g., camera 118 and camera 120) are cascaded such that one camera controls some or all operations of the other camera. In some examples, two or more cameras (e.g., camera 118 and camera 120) are cascaded such that data captured by one camera is used (e.g., by control module 114) to control some or all operations of the other camera. In one or more examples, endpoint 100 includes only a single camera, such as camera 118, and that camera is a wide angle electronic-pan-tilt-zoom camera. In some examples, when a view subject is zoomed in upon, a sub-portion of the captured image containing the subject is rendered, whereas other portions of the image are not. Additionally, one or more microphones 122 capture audio and provide the audio to the audio module 106 and codec 108 for processing. These microphones 122 can be table or ceiling microphones, or they can be part of a microphone pod or the like. In one or more examples, the microphones 122 are tightly coupled with one or more cameras (e.g., camera 118 and camera 120). The endpoint 100 uses the audio captured with these microphones 122 primarily for the conference audio.

As shown in FIG. 1, an endpoint 100 also includes microphone array 124, in which subarray 126 is orthogonally arranged with subarray 128. In some examples, microphone array 124 also captures audio and provides the audio to the audio module 106 for processing. In some examples, microphone array 124 includes both vertically and horizontally arranged microphones for determining locations of audio sources, e.g., people who are talking. In some examples, microphone array 124 includes only horizontally arranged microphones. In some examples, the endpoint 100 uses audio from the microphone array 124 primarily for camera tracking purposes and not for conference audio. In some examples, endpoint 100 uses audio from the microphone array 124 for both camera tracking and conference audio.

After capturing audio and video, the endpoint 100 encodes the audio and video in accordance with an encoding standard, such as MPEG-4, H.263, H.264 and H.265. Then, the network module 116 outputs the encoded audio and video streams to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 100 also includes a loudspeaker 130 which outputs conference audio, and a display 132 outputs conference video.

In at least one example of this disclosure, the endpoint 100 uses the two or more cameras 118, 120 in an automated and coordinated manner to handle video and views of the videoconference environment dynamically. In some examples, the first camera (e.g. 118) is a fixed or room-view camera, and the second camera 120 is a controlled or people-view camera. Using the room-view camera (e.g. 118), the endpoint 100 captures video of the room or at least a wide or zoomed-out view of the room that would typically include all the videoconference participants 121 as well as some of their surroundings.

According to some examples, the endpoint 100 uses the people-view camera (e.g., 120) to capture video of one or more participants, including one or more current talkers, in a tight or zoomed-in view. In at least one example, the people-view camera (e.g., 120) can pan, tilt and/or zoom.

In one arrangement, the people-view camera (e.g., 120) is a steerable pan-tilt-zoom (PTZ) camera, while the room-view camera (e.g., 118) is an electronic pan-tilt-zoom (EPTZ) camera. As such, the people-view camera (e.g., 120) can be steered, while the room-view camera (e.g., 118) cannot. In at least one example, both camera 118 and camera 120 are EPTZ cameras. In at least one example, camera 118 is associated with an audio based locator module 134. In other examples, both cameras 118, 120 are steerable PTZ cameras.

In some examples, the endpoint 100 alternates between tight views of a talker and wide views of a room. In some examples, the endpoint 100 alternates between two different tight views of the same or different talker. In some examples, the endpoint 100 will capture a first view of a person with one camera and a second view of the same person with another camera and determine which view is better for sharing with a remote endpoint 102.

In at least one example of this disclosure, the endpoint 100 outputs video from only one of the two cameras 118, 120 at any given time. As the videoconference proceeds, the output video from the endpoint 100 can switch from the view of one camera to another. In accordance with some examples, the endpoint 100 outputs a room-view when there is no participant talking a people-view when one or more participants 121 are talking.

In accordance with an example, the endpoint 100 can transmit video from both cameras 118, 120 simultaneously, and the endpoint 100 can let the remote endpoint 102 decide which view to display, or determine that one view will be displayed relative the other view in a specific manner. For example, one view can be composited as a picture-in-picture of the other view.

In one or more examples, the endpoint 100 uses audio-based locator 134 and a video-based locator 136 to determine locations of participants 121 and frame views of the environment and participants 121. A framing module 142 in the control module 114 uses audio and/or video information from these locators 134, 136 to perform framing operations, such as cropping one or more captured views, such that one or more subsections of a captured view are displayed on a display 132 and/or transmitted to a far site or remote endpoint 102. The framing module 142 also controls camera 118, 120 movement to obtain the desired framing. In some examples, commands to one or both cameras 118, 120 are implemented by an actuator or local control unit 138 having motors, servos, and the like to steer one or both cameras 118, 120 mechanically. In some examples, such camera commands can be implemented as electronic signals by one or both cameras 118, 120.

A wide view from one camera (e.g., 118) can give context to a zoomed view from another camera (e.g., 120) so that participants 121 at the remote endpoint 102 see video from one camera (e.g., 118) as the video from the other camera (e.g., 120) is being adjusted. In some examples, transitions between the two views from the cameras 118, 120 can be faded and blended to avoid sharp cut-a-ways when switching between camera views. In some examples, a switch from a first view to a second view for transmission to a remote endpoint 102 will not occur until an active participant 121 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 121 at an endpoint 100, the cultural niceties of the participants 140 at the remote endpoint 102, and the sizes of one or more displays 132 displaying captured views.

In examples where only a single camera 118 is present and that camera is a wide angle, high definition EPTZ camera, the above discussed framing options of room or participant views and talker views are developed from the single camera. In such examples, transitions are preferably performed as described in U.S. Pat. No. 10,778,941, which is hereby incorporated by reference. All of these decisions on particular views to be provided are made by the framing module 142.

Figure 2:
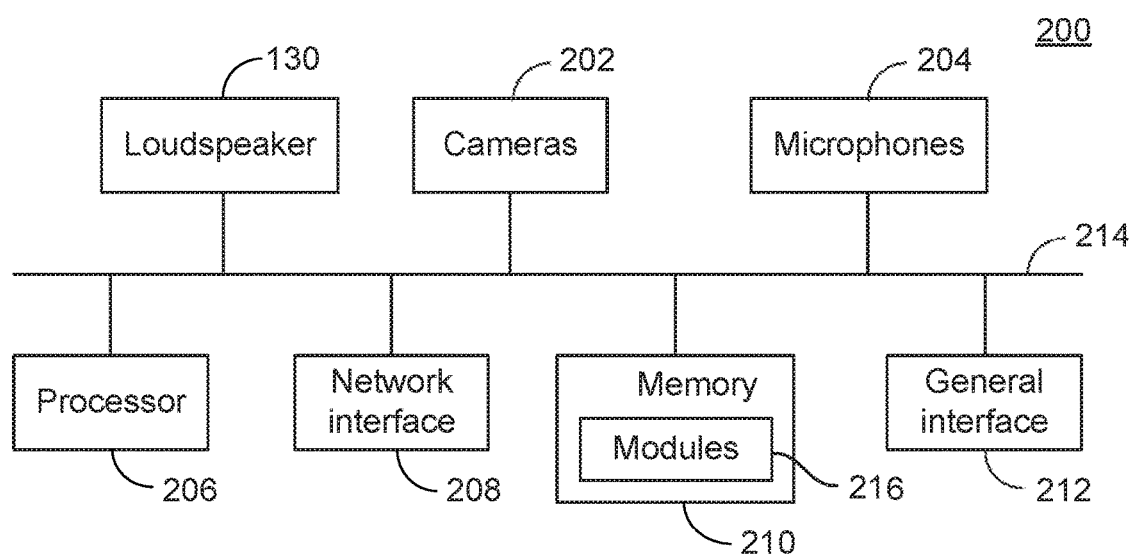
FIG. 2 is an illustration of aspects of the videoconferencing endpoint of FIG. 1.

FIG. 2 illustrates aspects of videoconferencing endpoint 200 (e.g., 100), in accordance with an example of this disclosure. The endpoint 200 includes a loudspeaker 130, cameras 202 (e.g., 118, 120) and microphones 204 (e.g., 122, 124) interfaced via interfaces to a bus 101. The endpoint 200 also includes a processing unit 206, a network interface 208, a memory 210 and an input/output general interface 212, all coupled by bus 101.

The processing unit 206 can include digital signal processors (DSPs), central processing units (CPUs), graphics processing units (GPUs), dedicated hardware elements, such as neural network accelerators and hardware codecs, and the like in any desired combination.

The memory 210 can be any conventional memory or combination of types of conventional memory, such as SDRAM and flash memory, and can store modules 216 in the form of software and firmware, generically programs, for controlling the endpoint 200. In addition to software and firmware portions of the audio and video codecs 108, 112, the audio and video based locators 134, 136, framing 142 and other modules discussed previously, the modules 216 can include operating systems, a graphical user interface (GUI) that enables users to control the endpoint 200, such as by selecting to mute the endpoint 200, and algorithms for processing audio/video signals and controlling the cameras 202. SDRAM can be used storing video images of video streams and audio samples of audio streams and can be used for scratchpad operation of the processing unit 206. In at least one example of this disclosure, one or more of the cameras 202 can be a panoramic camera.

The network interface 208 enables communications between the endpoint 200 and remote endpoints (102). In one or more examples, the general interface 212 provides data transmission with local devices such as a keyboard, mouse, printer, overhead projector, display, external loudspeakers, additional cameras, and microphone pods, etc.

The cameras 202 and the microphones 204 capture video and audio, respectively, in the videoconference environment and produce video and audio streams or signals transmitted through the bus 214 to the processing unit 206. In at least one example of this disclosure, the processing unit 206 processes the video and audio using algorithms in the modules 216. For example, the endpoint 200 processes the audio captured by the microphones 204 as well as the video captured by the cameras 202 to determine the location of participants 121 and control and select from the views of the cameras 202. Processed audio and video streams can be sent to remote devices coupled to network interface 208 and devices coupled to general interface 212. This is just one example of the configuration of an endpoint 100 and other configurations are well known.

Figure 3:
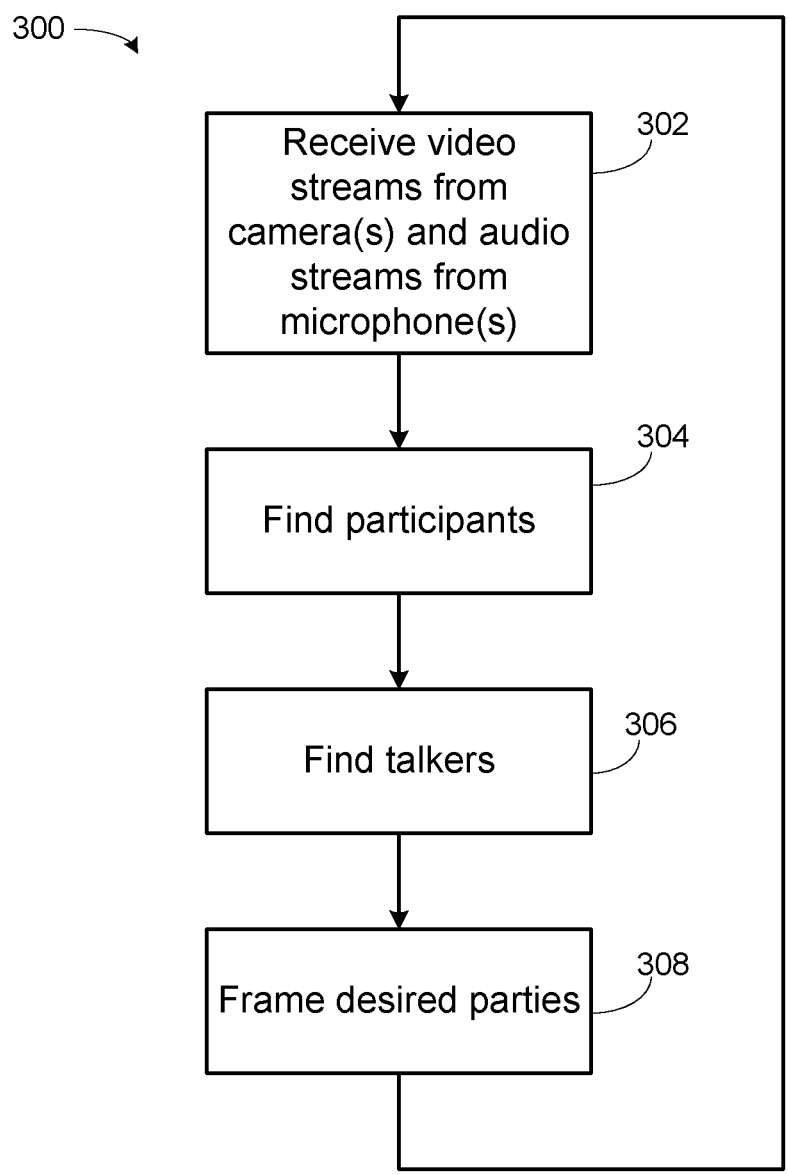
FIG. 3 is a high-level flowchart of participant framing operations of a videoconferencing endpoint.

Referring now to FIG. 3, a high-level flowchart 300 of participant framing is illustrated. In step 302, video streams are received from any cameras and audio streams are received for any microphones. In step 304, participants are located, generally using face or body finding in the video streams using the video-based locator 136. There a number of sub-modules in the video-based locator 136, a common sub-module being a neural network sub-module that performs face and body finding operations to locate participants. Examples of finding participants are provided in more detail in U.S. Pat. Nos. 8,395,653; 8,842,161; and 10,574,899, and PCT applications WO 2020/103078 A1, and WO 2020/103068 A1, which are hereby incorporated by reference.

In step 306, the audio streams are used in combination with the video streams to find talkers. Examples of talker localization include U.S. Pat. Nos. 9,030,520; 9,542,603; 9,723,260; 10,091,412; and 10,122,972, which are hereby incorporated by reference.

After the talkers are found in step 306, in step 308 the parties are framed as desired. Examples of framing decisions include U.S. Pat. Nos. 9,800,835; 10,187,579 and 10,778,941, which are hereby incorporated by reference. Further improvements in framing decisions are discussed below.

Figure 4:
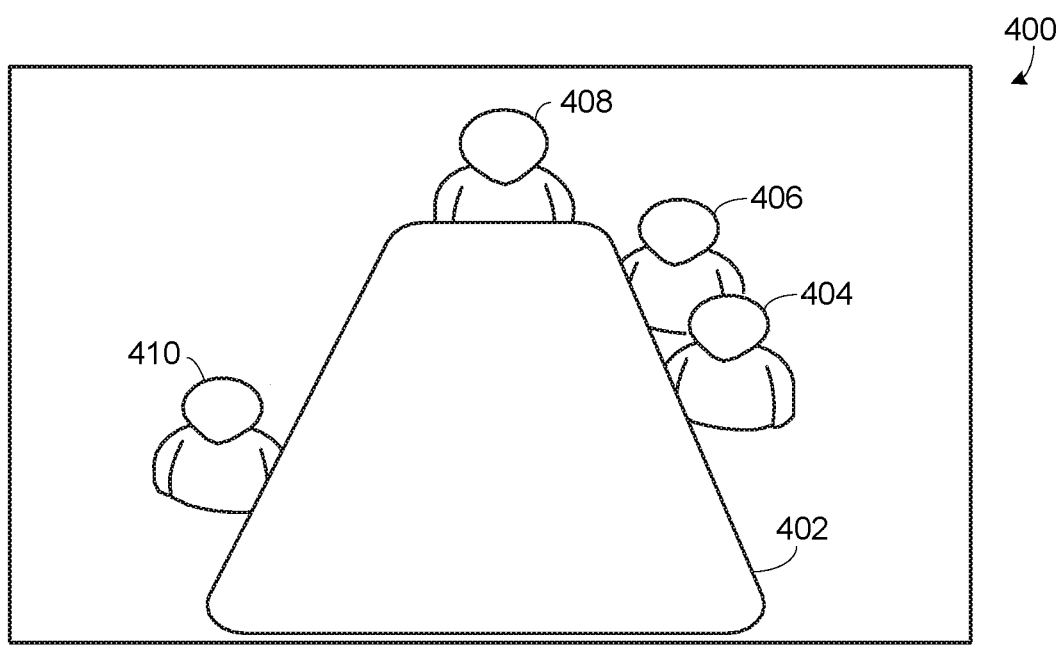
FIG. 4 is an illustration of a conference room and a number of participants to illustrate framing.

FIG. 4 represents an exemplary image of a conference room 400 containing four participants. A conference table 402 is present, with participants 404, 406, 408 and 410 around the conference table 402.

Figure 5:
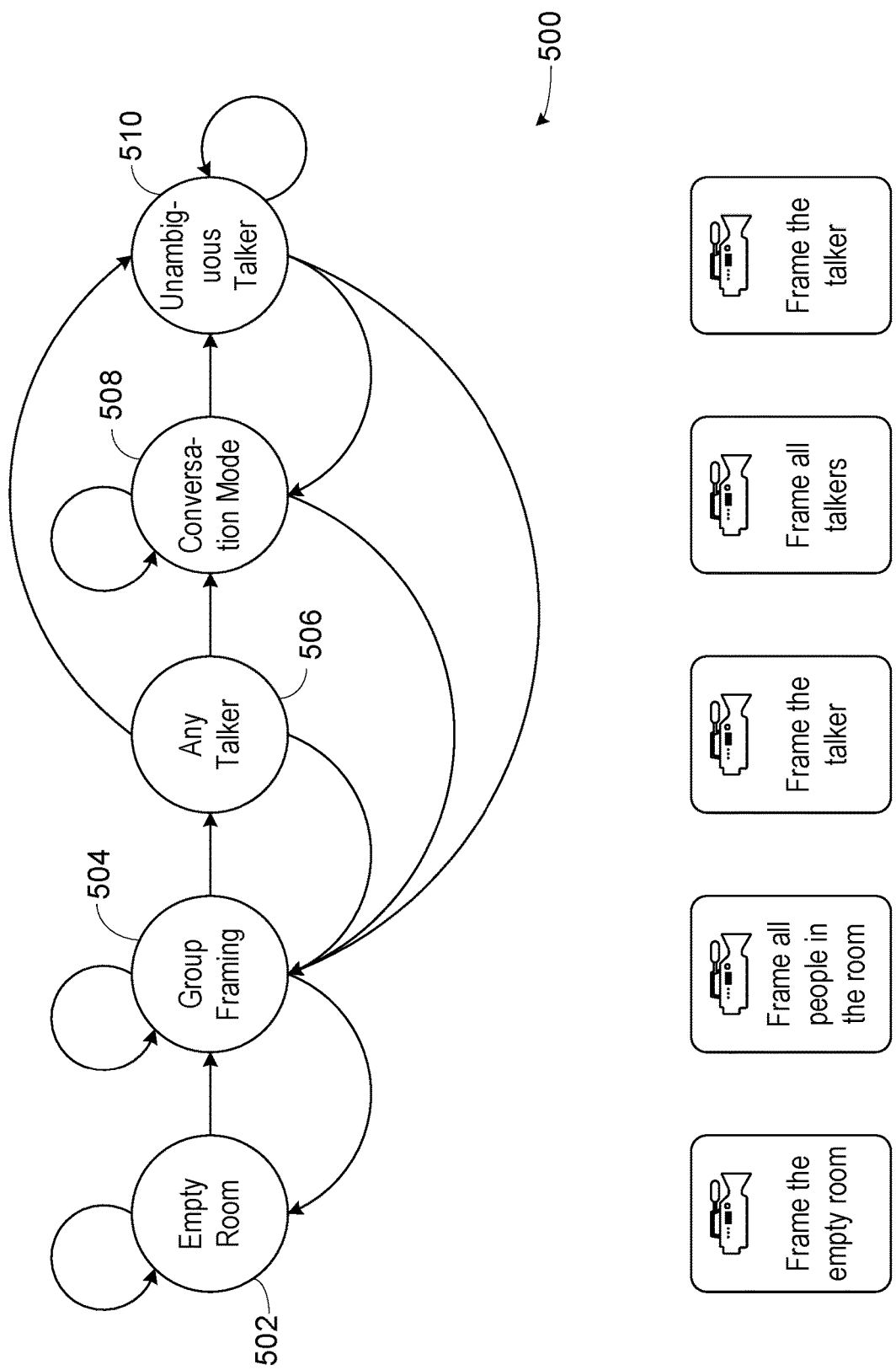
FIG. 5 is a state diagram of framing states and transitions, in accordance with an example of this disclosure.

FIG. 5 is an illustration of a state machine 500 for making framing decisions. The five states are empty room 502, group framing 504, any talker 506, conversation mode 508 and unambiguous talker 510. In empty room state 502, the camera view that is transmitted to the far site frames the empty conference room. In group framing state 504, the view that is transmitted frames all of the people or participants in the conference room. In any talker state 506, the view that is transmitted frames that individual talker or talker. In conversation mode state 508, the view that is transmitted frames all talkers or talkers. In unambiguous talker state 510, the view that is transmitted frames the talker.

When in empty room state 502, a transition can occur to group framing state 504 or can remain in empty room state 502. In group framing state 504, transitions can occur to empty room state 502, any talker state 506 or remain in group framing state 504. In any talker state 506, transitions can occur to conversation mode state 508, group framing state 504 or unambiguous talker state 510. In conversation mode state 508, transitions can occur to unambiguous talker state 510, group framing state 504 or remain in conversation mode state 508. In unambiguous talker state 510, transitions can occur to conversation mode state 508, group framing state 504 or remain in unambiguous talker state 510.

Figure 6:
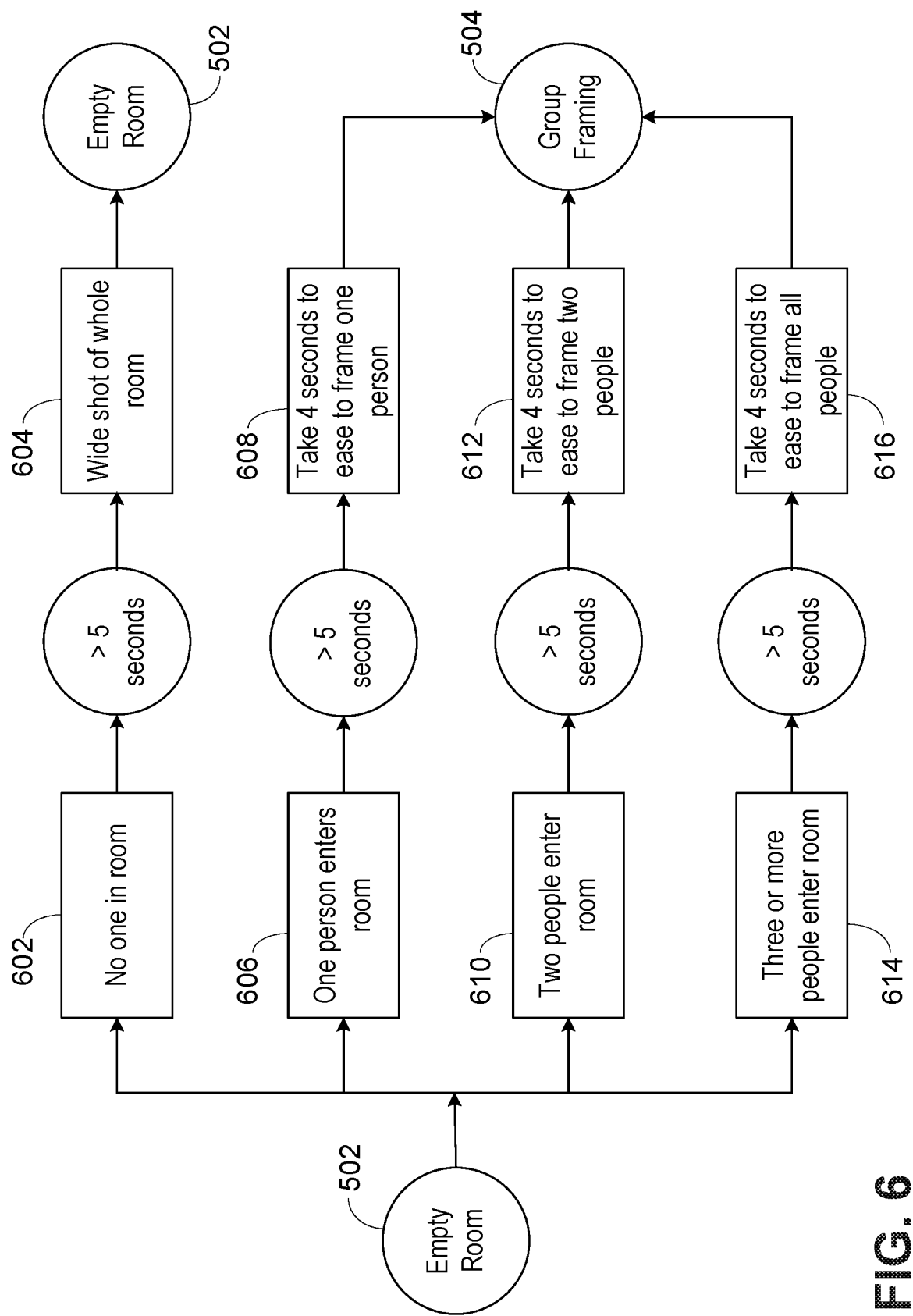
FIG. 6 is a state diagram illustrating transitions from the Empty Room state, in accordance with an example of this disclosure.

FIG. 6 illustrates transitions for empty room state 502. In condition 602, if it is determined that no one is in the room for a period that is greater than five seconds, the framing decision 604 is a wide shot of the whole room and to remain in empty room state 502. In condition 606, if it is determined that a person enters the room and remains there for a period that is greater than five seconds, the framing decision 608 is to take four seconds to ease, as described in U.S. Pat. No. 10,778,941, from the whole room shot to frame that individual person and enter group framing state 504. In condition 610, if it is determined that two people enter the room and remain there for a period that is greater than five seconds, the framing decision 612 is to take four seconds to ease from the whole room shot to frame those two people and proceed to group framing state 504. In condition 614, if it is determined that three or more people enter the room and remain there for a period that is greater than five seconds, the framing decision 616 is to take four seconds to ease from the whole room shot to frame all of the participants that have entered the room and proceed to group framing state 504.

Figure 7:
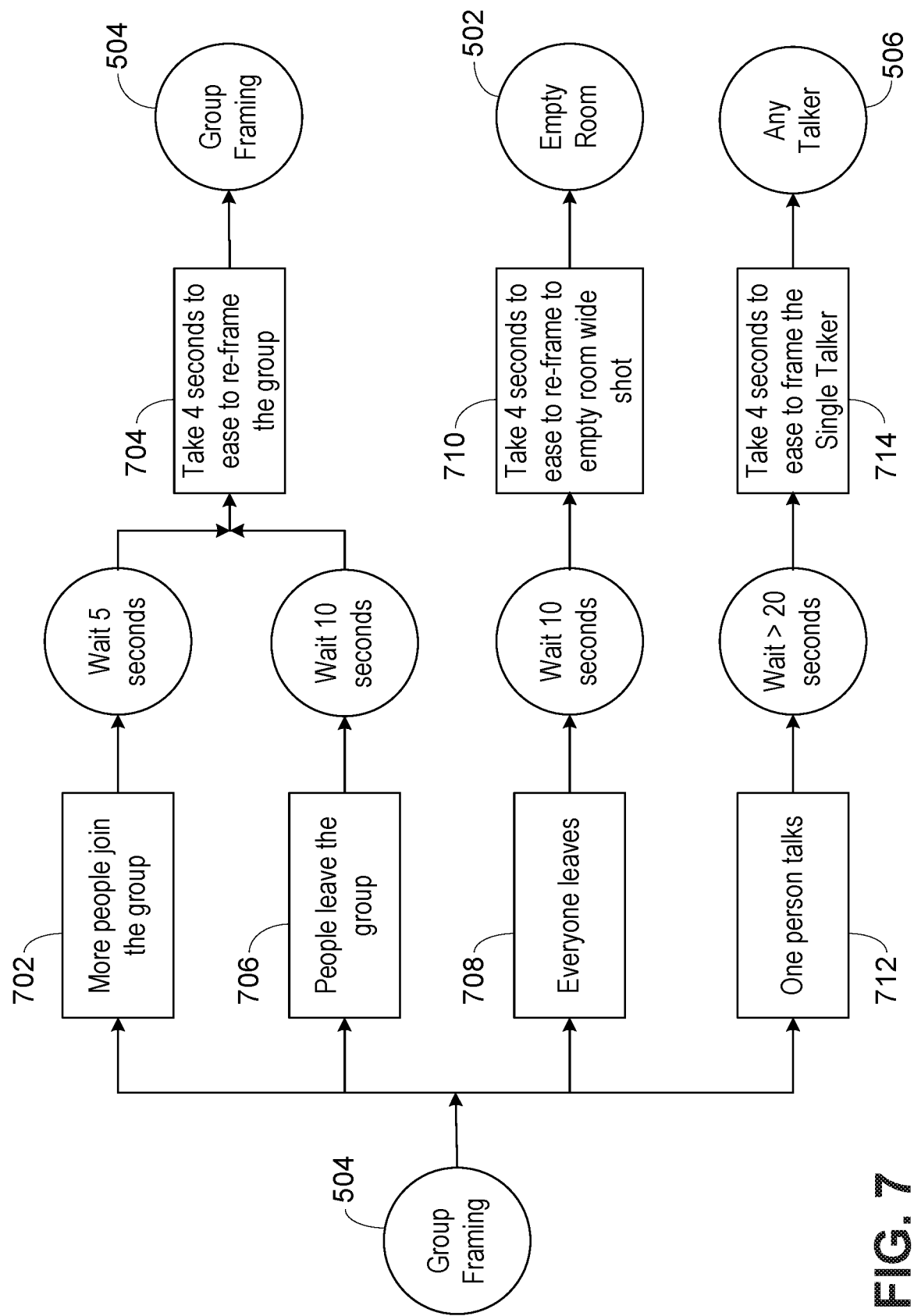
FIG. 7 is a state diagram illustrating transitions from the Group Framing state, in accordance with an example of this disclosure.

In FIG. 7, when in group framing state 504, in condition 702, if it is determined that more people join the group in the room and remain there for a period of five seconds or more, the framing decision 704 is to take four seconds to ease to reframe from the prior group to the current group and remain in group framing state 504. In condition 706, if it is determined that several people leave the group for a period that is ten seconds or more, the framing decision is framing decision 704. In condition 708, if it is determined that everyone leaves the room and remains out for a period that is 10 seconds or more, then the framing decision 710 takes four seconds to ease to reframing to the empty room wide shot and proceeds to the empty room state 502. In condition 712, if it is determined that a person in the room talks, after a period that is 20 seconds, the framing decision 714 is to take four seconds to ease to frame the single talker and enter any talker state 506.

Figure 8:
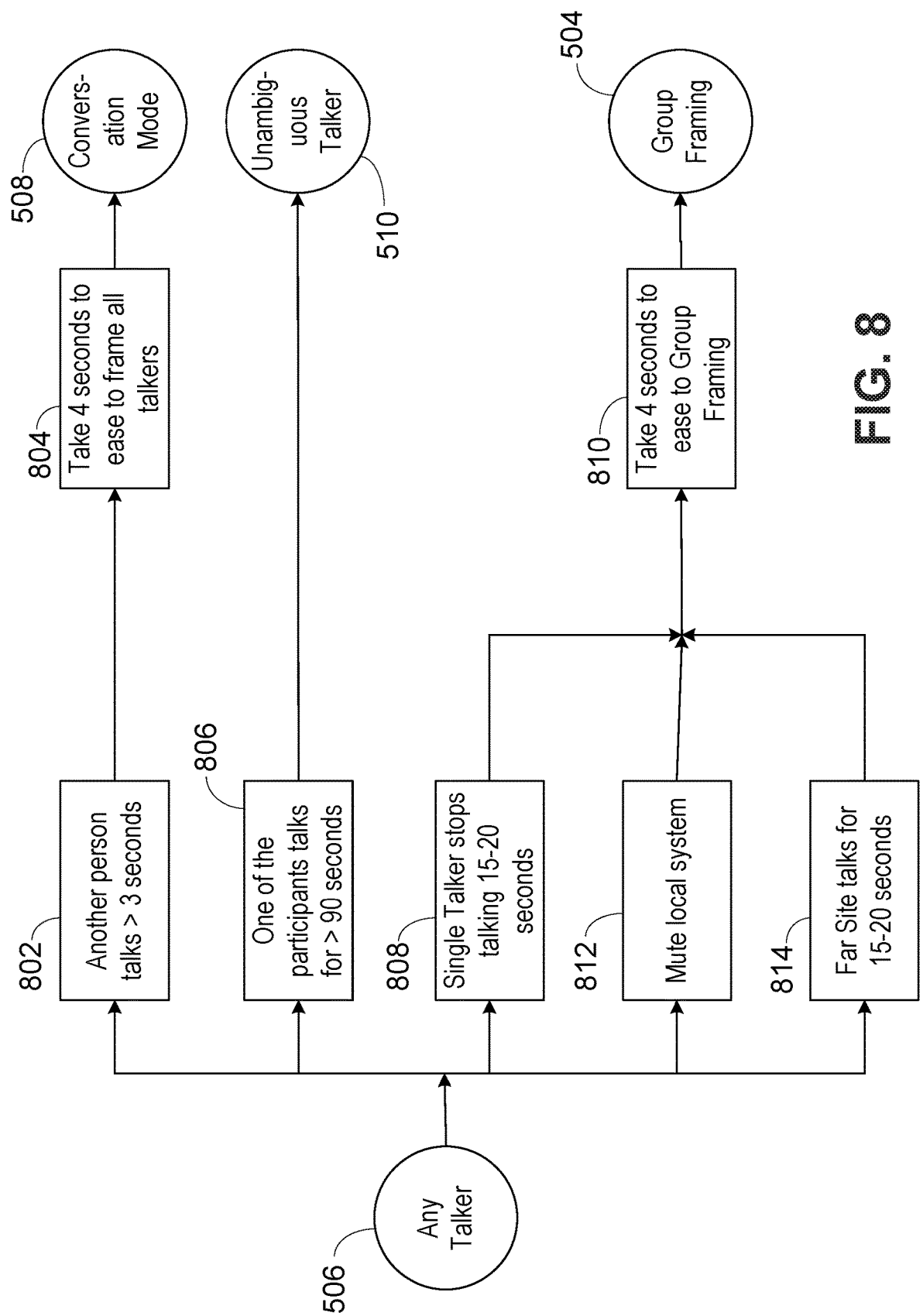
FIG. 8 is a state diagram illustrating transitions from the Any Talker state, in accordance with an example of this disclosure.

In FIG. 8, in any talker state 506, in condition 802, if it is determined that another person talks for a period that is greater than three seconds, the framing decision 804 is to take four seconds to ease to frame all of the talkers and to enter conversation mode state 508. In condition 806, if it is determined that the single talker continues to talk for a period that is greater than 90 seconds, the framing remains the same but state changes to the unambiguous talker state 510. In condition 808, if it is determined that the single talker stops talking for a period, such as 15 to 20 seconds, the framing decision 810 is to take four seconds to ease to group framing and enter group framing state 504. While in any talker state 506, in condition 812, if it is determined that the local endpoint 100 is muted, then the framing decision is framing decision 810. In condition 814, if it is determined that the far or remote site talks for a period, such as 15 to 20 seconds, the framing decision is again framing decision 810.

Figure 9:
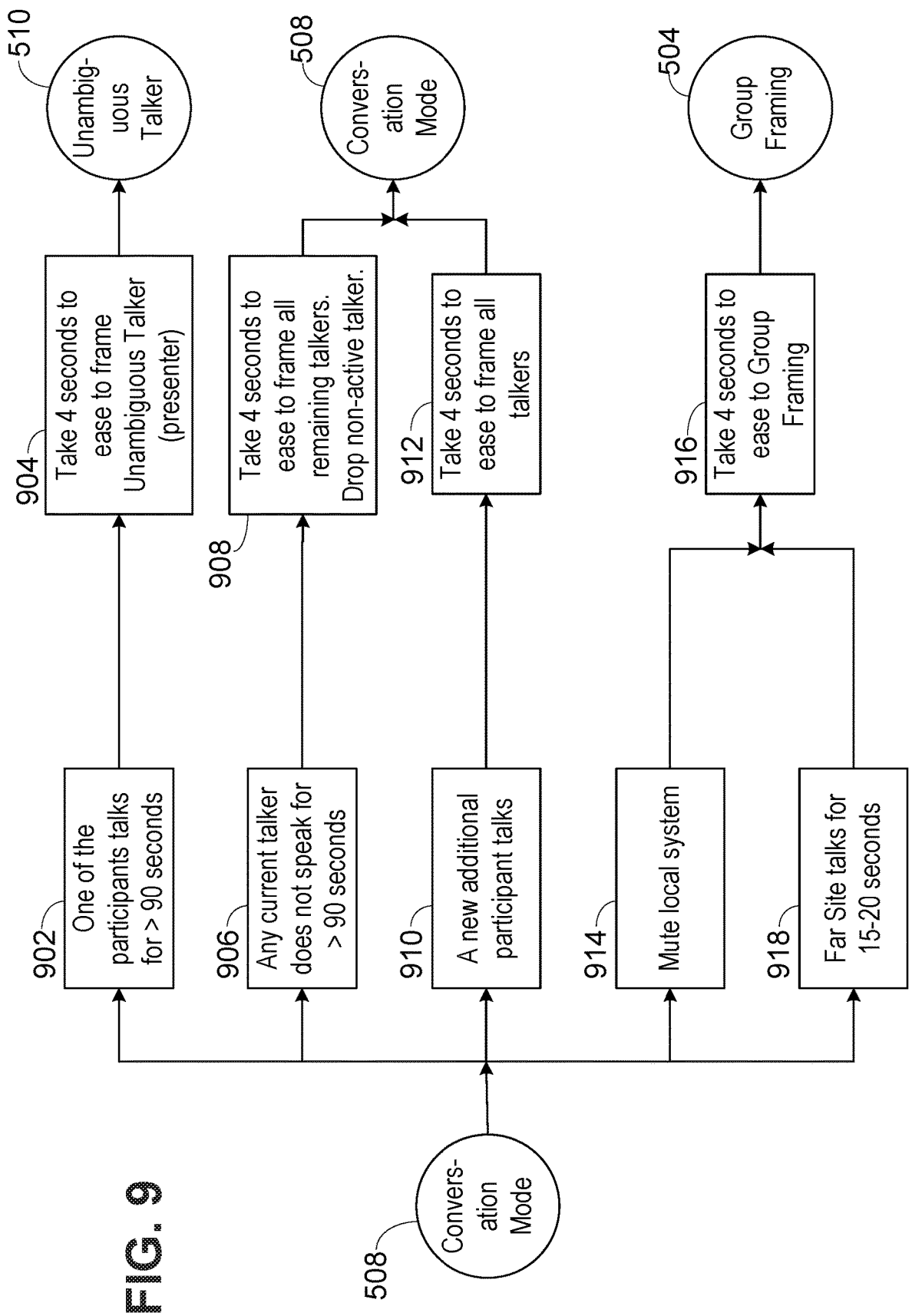
FIG. 9 is a state diagram illustrating transitions from the Conversation state, in accordance with an example of this disclosure.

In FIG. 9, in conversation mode state 508, in condition 902, if it is determined that one of the participants talks for a period that is greater than 90 seconds, the framing decision 904 is to take ten seconds to ease to frame the unambiguous talker, as it is assumed that he is a presenter, and unambiguous talker state 510 is entered. In condition 906, if it is determined that any current talker does not talk for a period that is greater than 90 seconds, then the framing decision 908 is to take four seconds to ease to frame the remaining talkers and drop the non-active talker. The state remains in conversation mode state 508. In one example, this is the case even if there is only one talker remaining. In another example, an additional condition can be inserted after condition 906 to determine if there is only one talker remaining. If not, then framing decision 908 is performed. If it is determined that there is only one talker remaining, the framing decision is framing decision 714 and the state becomes the any talker state 506. In condition 910, if it is determined that a new additional participant talks, preferably for a period that is greater than three seconds, the framing decision 912 is to take four seconds to ease to frame all talkers and then remain in conversation mode state 508. In condition 914, if it is determined that the local endpoint 100 is muted, the framing decision 916 is to take four seconds to ease to group framing and then enter group framing state 504. Similarly, in condition 918, if it is determined that the far site talks for a period, such as 15 to 20 seconds, the framing decision is framing decision 916.

Figure 10:
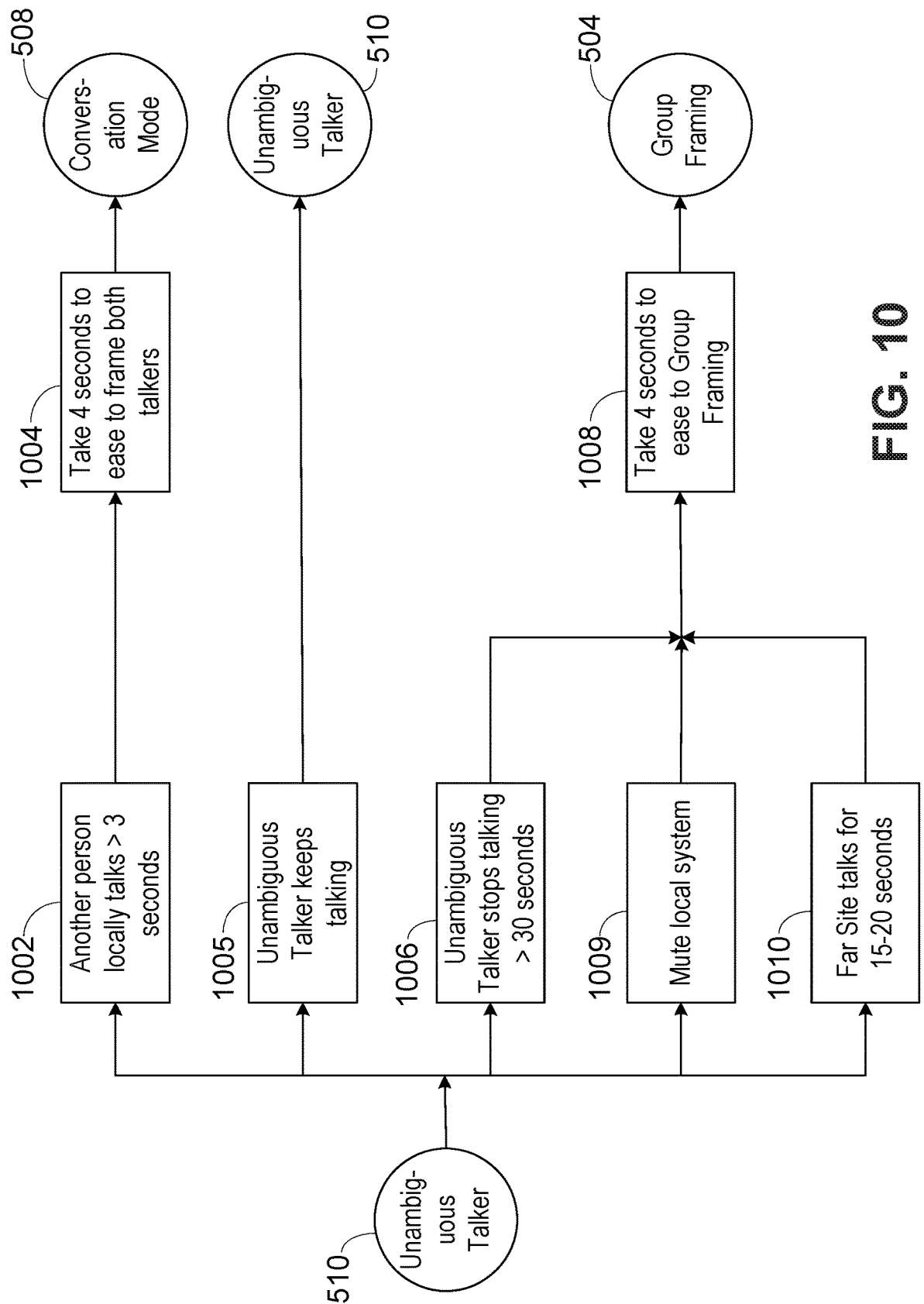
FIG. 10 is a state diagram illustrating transitions from the Unambiguous Taler state, in accordance with an example of this disclosure.

In FIG. 10, in unambiguous talker state 510, in condition 1002, if it is determined that another person at the near and or local end talks for a period greater than three seconds, the framing decision 1004 is to take four seconds to ease to frame both talkers and enter conversation mode state 508. In condition 1005, if it is determined that the person that is talking continues to talk, the unambiguous talker state 510 is continued. In condition 1006, if it is determined that the unambiguous talker stops talking for greater than 30 seconds, the framing decision 1008 is to take four seconds to ease to group framing and enter group framing state 504. In condition 1009, if it is determined that the local endpoint 100 is muted, or in condition 1010, if it is determined that the far site talks for a period, such as 15 to 20 seconds, the framing decision is framing decision 1008.

While specific times have been mentioned for conditions or to ease for reframing, other times can be used for each instance. The specific values mentioned have been tested and are considered to provide pleasing results for the far site, but other values will also provide pleasing results.

Figure 11:
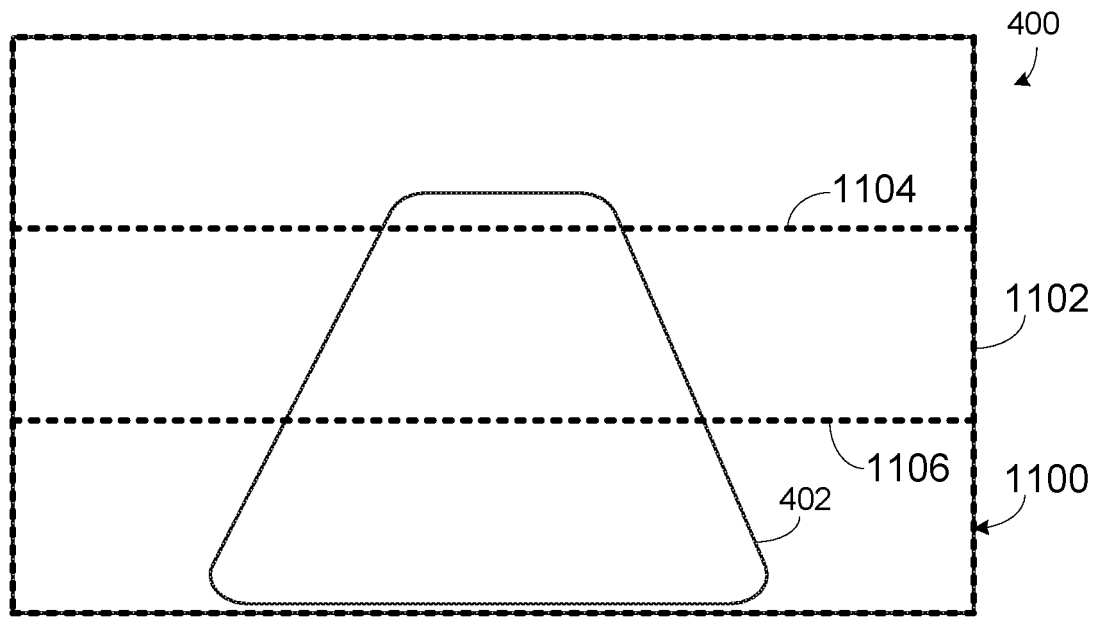
FIG. 11 is a view of a conference room, with a rule of thirds grid, in accordance with an example of this disclosure.

FIGS. 11 to 16 provide illustrations of the framing for particular states and under particular conditions. Referring to Figure ii, the scene is the empty conference room 400 containing just the conference table 402. A grid of dashed lines 1100 is comprised of outer rectangle or frame 1102, the frame of the image to be provided to the far site, and two horizontal lines 1104 and 1106, which represent horizontal rule of thirds lines. The rule of thirds is a guideline that an image should be imagined to be divided into three equal parts and that objects look best aligned with the particular lines. FIG. 11 represents the empty room state 502, where the entire conference room 400 is framed.

Figure 12:
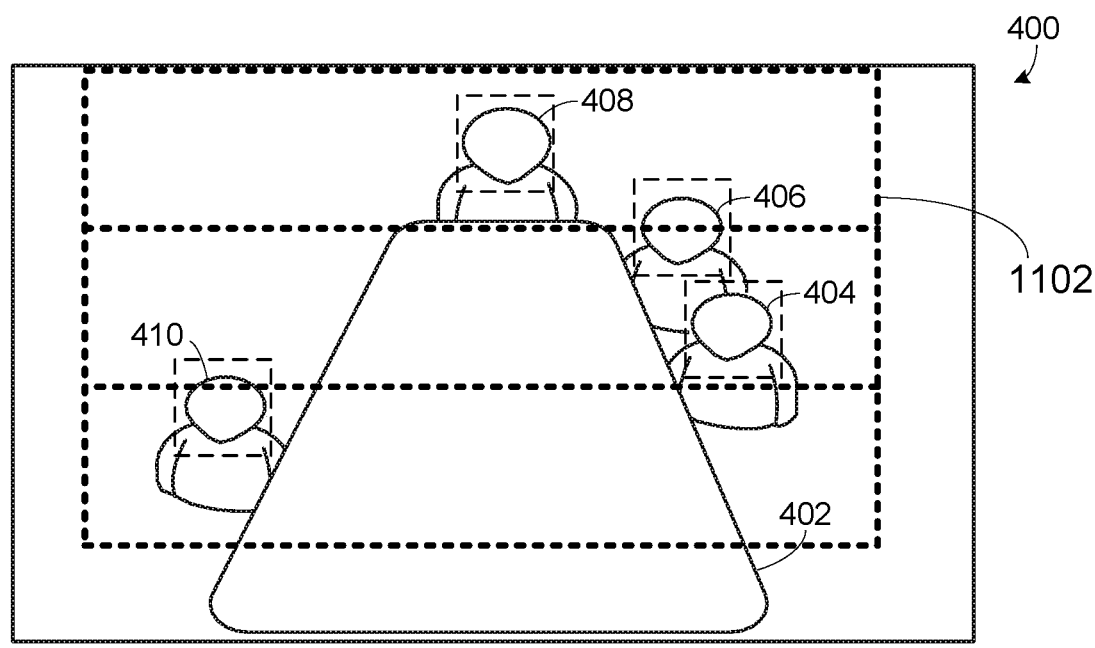
FIG. 12 is a view of the conference room of FIG. 11 with four participants framed in Group Framing mode with the resulting rule of thirds grid, in accordance with an example of this disclosure.

Referring to FIG. 12, the four participants 404, 406, 408 and 410 have been placed around the conference table 402. All of the participants 404-410 are silent so because there were more than three people in condition 614 group framing, so condition 614 occurred and the state is group framing state 504. The frame 1102 has been reduced in size from that of FIG. 11 to only contain the four participants 404-410 and not the remainder of the conference room 400. It is noted that there is a dashed square around the head symbol of each participant. That dashed square represents the bounding box as determined by the video-based locator 136.

Figure 13:
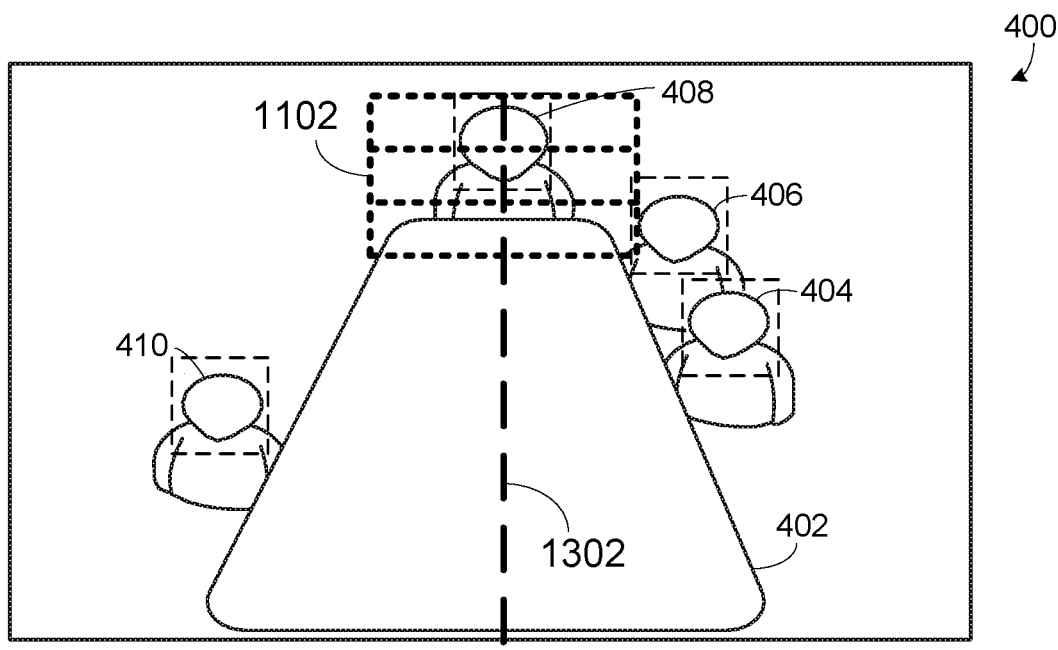
FIG. 13 is a view of the conference room of FIG. 11 and participants of FIG. 12 with a single talker in Any Talker mode with the resulting rule of thirds grid, in accordance with an example of this disclosure.
Figure 14:
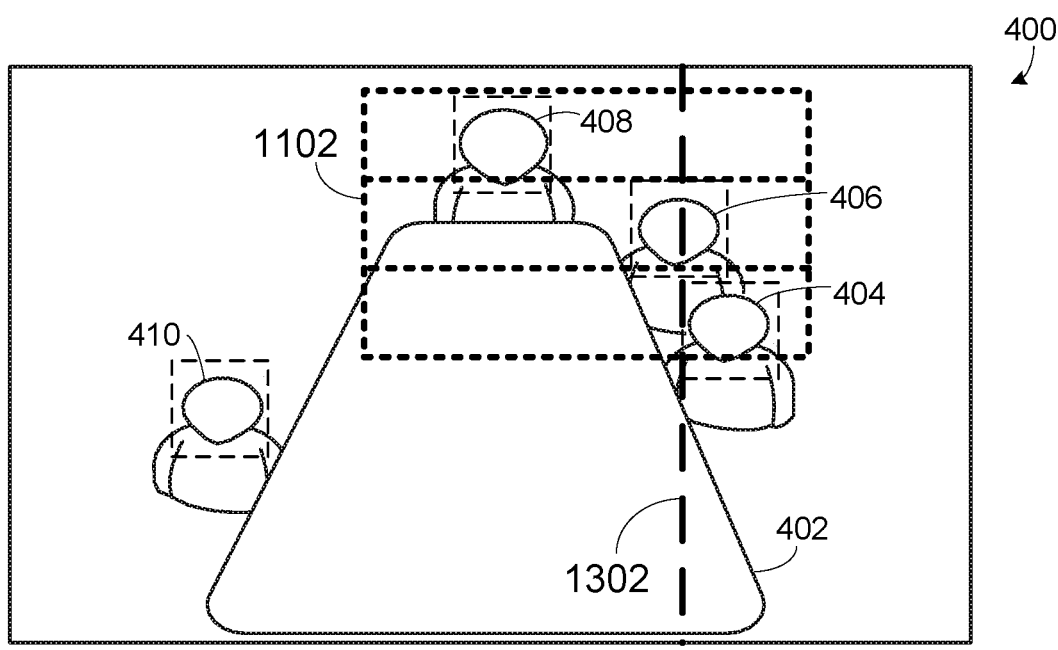
FIG. 14 is a view of the conference room of FIG. 11 and participants of FIG. 12 with two talkers in Conversation mode with the resulting rule of thirds grid, in accordance with an example of this disclosure.
Figure 15:
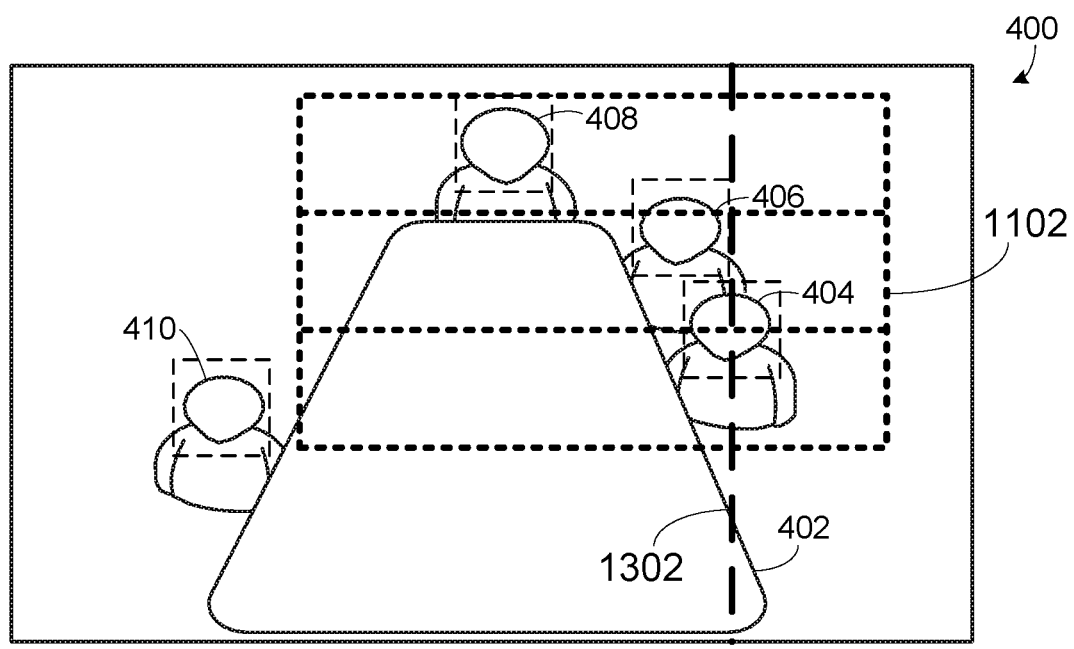
FIG. 15 is a view of the conference room of FIG. 11 and participants of FIG. 12 with three talkers in Conversation mode with the resulting rule of thirds grid, in accordance with an example of this disclosure.
Figure 16:
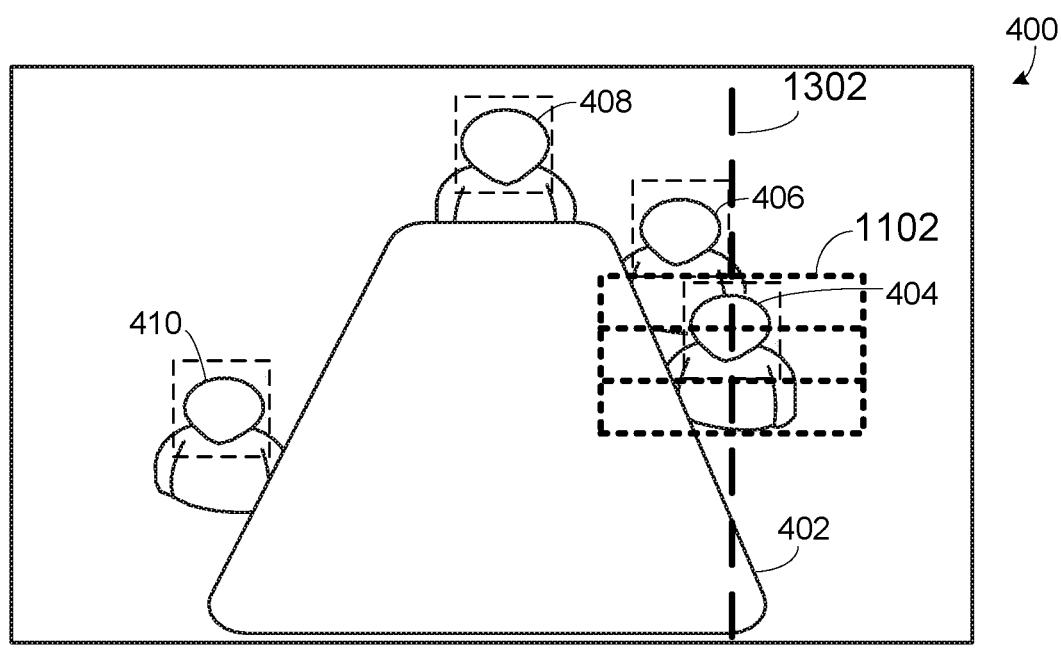
FIG. 16 is a view of the conference room of FIG. 11 and participants of FIG. 12 with one talker in Unambiguous Talker mode with the resulting rule of thirds grid, in accordance with an example of this disclosure.

In FIG. 13, participant 408 begins talking. This is indicated by a vertical dashed line 1302 which represents the audio-based locator module 134 talker determination line. This situation now meets condition 712 and the frame 1102 is reduced in size to frame just participant 408 in any talker state 506. Then in FIG. 14, participant 406 has started to talk as indicated by the vertical dashed line 1302. Therefore, condition 802 is met and the frame 1102 has been increased in size and moved shifted slightly to include both participant 408 and participant 406. At this time, the system is in conversation mode state 508. In FIG. 15, a third participant 404 has started talking, meeting condition 910, so the frame 1102 has been reconfigured to frame all three participants 404, 406, 408 as they are all talkers in the conversation. The state remains in conversation mode state 508. In FIG. 16, participant 404 has continued talking for a period of time greater than 90 seconds, meeting condition 902, so that the frame 1102 is changed to frame just participant 404, as she is considered to be a presenter.

If participant 406 were to commence talking for greater than three seconds, condition 1002 is met and the frame 1102 would change to include both participants 404 and 406. If participant 408 then proceeds to start talking, the frame 1102 returns to that shown in FIG. 15, as condition 910 was met. If participant 406 stops talking for 90 seconds, the frame 1102 would actually remain in the same position as in FIG. 15 but it would simply be framing participants 404 and 408. Participant 406 would still be shown because participant 406 is in between participant 404 and 408. If participant 410 then commences talking, the frame 1102 would expand in size to match the frame in FIG. 12 as now participants 404, 408 and 410 would be the active talkers and therefore basically everyone in the room other than participant 406 would be talking. If participant 410 proceeds to talk for a period greater than 90 seconds, the frame 1102 would ease to frame only participant 410, similar to that shown in FIG. 16 for framing participant 404. Then if participant 408 starts talking, the frame 1102 is configured to frame participants 410 and 408. Participants 404 and 406 would be visible at the far edge of the frame 1102, as the frame 1102 would retain proportion and thus capture them. The far site starts talking for greater than 20 seconds and the frame 1102 returns to the group framing of FIG. 12.

Therefore, the use of the described framing states, framing conditions and transitions provides pleasant transitions between the various situations from empty rooms to non-speaking participants to single talkers through multiple talkers to a presenter mode back to multiple talkers in a conversation mode and so on. The conversation states and conditions and framing decisions provide a fully automated framing mechanism to provide pleasant framing of the individuals in the near for any of the conditions relating to number of talkers, participants and the like. The far site now sees the appropriate number of individuals that are talking, either in focus if there is only one or multiple if multiple individuals are talking. If no individuals are talking or the far site is doing the talking, then the natural position of framing the group is performed. These framing decisions are performed automatically without requiring input by any participant or administrator, to automatically provide a pleasant experience for the far site.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:
1. A method of framing a view of a near site provided to a far site in a videoconference, the method comprising:
 determining a number of participants present at the near site;

determining a number and locations of talkers at the near site;
determining if the near site is muted;
determining if the far site is talking; and
traversing states of a state machine based on the determinations of number of participants present at the near site, number and locations of talkers at the near site, near site is muted and far site is talking and changes in those determinations,
wherein each state defines a particular view for framing,
wherein if the number of talkers at the near site changes, changing the view for framing to encompass all talkers as the number of talkers changes, and
wherein the number of talkers at the near site can equal or exceed three talkers.

2. The method of claim 1, wherein traversing states of the state machine are further based on time periods from changes in determinations.

3. The method of claim 1, wherein the states include an any talker state and a conversation mode state,
wherein in the any talker state, only a single participant is talking,
wherein in the any talker state the view for framing is the talker,
wherein in the conversation mode state a plurality of talkers are or have been talking, and
wherein in the conversation mode state the view for framing is all of the talkers.

4. The method of claim 3, wherein in the conversation mode state, when the number of talkers changes, the view is reframed to be a view of all current talkers.

5. The method of claim 3, wherein the states include an unambiguous talker state,
wherein the unambiguous talker state is entered when a given participant has been talking for a period of time to be considered a presenter, and
wherein in the unambiguous talker state the view for framing is the talker.

6. The method of claim 5, wherein the states include a group framing state,
wherein in the group framing state either no participants are talking, the near site is muted or the far site is talking, and
wherein in the group framing state the view for framing is of all participants.

7. The method of claim 6, wherein the states include an empty room state,
wherein in the empty room state there are no participants, and
wherein in the empty room state, the view for framing is the entire near site.

8. A videoconferencing device comprising:
a camera interface for receiving a videoconferencing video stream at a near site;
a microphone interface for receiving a videoconferencing audio stream at the near site;
a network interface for receiving videoconference streams from at least one far site and providing videoconference streams to the at least one far site;
a processor coupled to the camera interface, the microphone interface and the network interface for executing programs and operations to perform videoconferencing operations; and
memory coupled to the processor for storing programs executed by the processor, the memory storing programs executed by the processor to perform the operations of:
determining a number of participants present at the near site;
determining a number and locations of talkers at the near site;
determining if the near site is muted;
determining if the far site is talking; and
traversing states of a state machine based on the determinations of number of participants present at the near site, number and locations of talkers at the near site, near site is muted and far site is talking and changes in those determinations,
wherein each state defines a particular view for framing,
wherein if the number of talkers at the near site changes, changing the view for framing to encompass all talkers as the number of talkers changes, and
wherein the number of talkers at the near site can equal or exceed three talkers.

9. The videoconferencing device of claim 8, wherein traversing states of the state machine are further based on time periods from changes in determinations.

10. The videoconferencing device of claim 8, wherein the states include an any talker state and a conversation mode state,
wherein in the any talker state, only a single participant is talking,
wherein in the any talker state the view for framing is the talker,
wherein in the conversation mode state a plurality of talkers are or have been talking, and
wherein in the conversation mode state the view for framing is all of the talkers.

11. The videoconferencing device of claim 10, wherein in the conversation mode state, when the number of talkers changes, the view is reframed to be a view of all current talkers.

12. The videoconferencing device of claim 10, wherein the states include an unambiguous talker state,
wherein the unambiguous talker state is entered when a given participant has been talking for a period of time to be considered a presenter, and
wherein in the unambiguous talker state the view for framing is the talker.

13. The videoconferencing device of claim 12, wherein the states include a group framing state,
wherein in the group framing state either no participants are talking, the near site is muted or the far site is talking, and
wherein in the group framing state the view for framing is of all participants.

14. The videoconferencing device of claim 13, wherein the states include an empty room state,
wherein in the empty room state there are no participants, and
wherein in the empty room state, the view for framing is the entire near site.

15. A non-transitory processor readable memory containing programs that when executed cause a processor to perform the following method of framing a view of a near site provided to a far site in a videoconference, the method comprising:
determining a number of participants present at the near site;
determining a number and locations of talkers at the near site;
determining if the near site is muted;
determining if the far site is talking; and traversing states of a state machine based on the determinations of number of participants present at the near site, number and locations of talkers at the near site, near site is muted and far site is talking and changes in those determinations, wherein each state defines a particular view for framing, wherein if the number of talkers at the near site changes, changing the view for framing to encompass all talkers as the number of talkers changes, and wherein the number of talkers at the near site can equal or exceed three talkers.

16. The non-transitory processor readable memory of claim 15, wherein traversing states of the state machine are further based on time periods from changes in determinations.

17. The non-transitory processor readable memory of claim 15, wherein the states include an any talker state and a conversation mode state, wherein in the any talker state, only a single participant is talking, wherein in the any talker state the view for framing is the talker, wherein in the conversation mode state a plurality of talkers are or have been talking, and wherein in the conversation mode state the view for framing is all of the talkers.

18. The non-transitory processor readable memory of claim 17, wherein in the conversation mode state, when the number of talkers changes, the view is reframed to be a view of all current talkers.

19. The non-transitory processor readable memory of claim 17, wherein the states include an unambiguous talker state, wherein the unambiguous talker state is entered when a given participant has been talking for a period of time to be considered a presenter, and wherein in the unambiguous talker state the view for framing is the talker.

20. The non-transitory processor readable memory of claim 19, wherein the states include a group framing state and an empty room state, wherein in the group framing state either no participants are talking, the near site is muted or the far site is talking, wherein in the group framing state the view for framing is of all participants, wherein in the empty room state there are no participants, and wherein in the empty room state, the view for framing is the entire near site.

\* \* \* \* \*